US009697467B2

(12) United States Patent
Riabov et al.

(10) Patent No.: US 9,697,467 B2
(45) Date of Patent: Jul. 4, 2017

(54) GOAL-DRIVEN COMPOSITION WITH PREFERENCES METHOD AND SYSTEM

(71) Applicant: International Business Machines Corporation, Armonk, NY (US)

(72) Inventors: Anton V. Riabov, Ann Arbor, MI (US); Shirin Sohrabi Araghi, White Plains, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 14/283,945

(22) Filed: May 21, 2014

(65) Prior Publication Data
US 2015/0339582 A1 Nov. 26, 2015

(51) Int. Cl.
*G06F 17/00* (2006.01)
*G06N 5/04* (2006.01)

(52) U.S. Cl.
CPC .................................... *G06N 5/04* (2013.01)

(58) Field of Classification Search
None
See application file for complete search history.

(56) References Cited

U.S. PATENT DOCUMENTS

| 5,122,801 A | 6/1992 | Hughes |
| 5,508,928 A | 4/1996 | Tran |
| 6,263,358 B1 | 7/2001 | Lee et al. |
| 6,438,741 B1 * | 8/2002 | Al-omari .......... G06F 17/30463 707/694 |
| 7,139,686 B1 | 11/2006 | Critz et al. |
| 7,370,022 B2 | 5/2008 | Gupta et al. |
| 7,472,379 B2 | 12/2008 | Chessell et al. |
| 7,617,224 B2 | 11/2009 | Moulckers et al. |
| 7,962,430 B1 | 6/2011 | Heidenreich et al. |

(Continued)

FOREIGN PATENT DOCUMENTS

| EP | 443212 | 8/1991 |
| EP | 443212 | 6/1997 |

OTHER PUBLICATIONS

Nguyen et al., "Generating Diverse Plans to Handle Unknown and Partially Known User Preferences", Artificial Intelligence, vol. 190, Jun. 18, 2012, pp. 1-31.*

(Continued)

*Primary Examiner* — Paulinho E Smith
(74) *Attorney, Agent, or Firm* — Cahn & Samuels, LLP

(57) ABSTRACT

In at least one embodiment, a method and a system for determining a set of plans that best match a set of preferences. The method may include receiving into a goal specification interface at least one goal to be accomplished by the set of plans; receiving into a preference engine a pattern that includes preferences; generating a planning problem by using the preference engine; generating a set of plans by at least one planner; and providing the set of plans for selection of one plan to deploy. In a further embodiment, the preferences may be an occurrence or non-occurrence of at least one component, an occurrence of one component over another component, an ordering between at least two components, an existence or non-existence of at least one tag in a final stream, an existence of one tag over another tag in the final stream.

12 Claims, 6 Drawing Sheets

(56) References Cited

U.S. PATENT DOCUMENTS

| | | | |
|---|---|---|---|
| 8,799,189 B2 | 8/2014 | Schwoegler et al. | |
| 9,047,464 B2 | 6/2015 | Sambamurthy et al. | |
| 2001/0049793 A1 | 12/2001 | Sugimoto | |
| 2003/0069869 A1* | 4/2003 | Gronau | G06Q 10/06 706/46 |
| 2003/0139902 A1 | 7/2003 | Geib et al. | |
| 2003/0233569 A1 | 12/2003 | Geib et al. | |
| 2006/0106477 A1 | 5/2006 | Miyashita | |
| 2007/0005523 A1 | 1/2007 | Maren | |
| 2007/0204020 A1* | 8/2007 | Anderson | G06Q 10/06 709/223 |
| 2007/0250331 A1* | 10/2007 | Liu | G06Q 10/00 709/200 |
| 2008/0016547 A1* | 1/2008 | Anderson | H04L 63/10 726/1 |
| 2008/0034439 A1* | 2/2008 | Chen | H04L 63/105 726/27 |
| 2008/0071716 A1* | 3/2008 | Anderson | G06N 5/04 706/45 |
| 2008/0196012 A1 | 8/2008 | Cohen et al. | |
| 2008/0243449 A1* | 10/2008 | Feblowitz | G06F 8/10 703/2 |
| 2008/0243450 A1* | 10/2008 | Feblowitz | G06F 8/10 703/2 |
| 2008/0243451 A1* | 10/2008 | Feblowitz | G06F 17/30516 703/2 |
| 2008/0244236 A1* | 10/2008 | Feblowitz | H04L 65/60 712/220 |
| 2008/0244540 A1* | 10/2008 | Feblowitz | G06F 8/10 717/143 |
| 2008/0250390 A1* | 10/2008 | Feblowitz | G06F 8/34 717/114 |
| 2008/0256549 A1* | 10/2008 | Liu | G06F 9/4881 718/106 |
| 2008/0288595 A1* | 11/2008 | Liu | G06Q 10/10 709/206 |
| 2008/0313595 A1* | 12/2008 | Boulineau | G06F 8/20 717/101 |
| 2009/0055344 A1 | 2/2009 | Dugan et al. | |
| 2009/0177910 A1* | 7/2009 | Liu | G06F 11/3664 714/2 |
| 2010/0011255 A1 | 1/2010 | de Kleer et al. | |
| 2010/0242120 A1* | 9/2010 | Anderson | G06Q 10/06 726/27 |
| 2011/0004863 A1* | 1/2011 | Feblowitz | G08G 1/04 717/105 |
| 2011/0060708 A1 | 3/2011 | Suzuki | |
| 2011/0087515 A1* | 4/2011 | Miller | G06Q 10/04 705/7.26 |
| 2011/0098056 A1 | 4/2011 | Rhoads et al. | |
| 2011/0107273 A1* | 5/2011 | Ranganathan | G06F 8/10 715/854 |
| 2011/0131557 A1 | 6/2011 | Bouillet et al. | |
| 2012/0030729 A1 | 2/2012 | Schwartz et al. | |
| 2012/0117015 A1 | 5/2012 | Sathish | |
| 2012/0233590 A1 | 9/2012 | Ranganathan et al. | |
| 2013/0024408 A1 | 1/2013 | Firminger et al. | |
| 2013/0080995 A1 | 3/2013 | Raza | |
| 2013/0232156 A1 | 9/2013 | Dunn et al. | |
| 2014/0040279 A1 | 2/2014 | Beygelzimer et al. | |
| 2014/0081896 A1* | 3/2014 | Ranganathan | G06N 5/02 706/48 |
| 2014/0282359 A1* | 9/2014 | Feblowitz | G06F 8/20 717/104 |
| 2014/0351184 A1* | 11/2014 | Bhowmick | G06Q 10/06 706/12 |
| 2014/0379615 A1* | 12/2014 | Brigham | G06N 99/005 706/11 |
| 2015/0339580 A1* | 11/2015 | Riabov | G06Q 10/06 706/11 |
| 2015/0339582 A1* | 11/2015 | Riabov | G06N 5/04 706/11 |
| 2016/0117602 A1* | 4/2016 | Hassanzadeh | G06F 17/30598 706/11 |

OTHER PUBLICATIONS

Aljazzar, H., et al., "K*: A Heuristic Search Algorithm for Finding the k Shortest Paths", Artificial Intelligence, pp. 2129-2154 vol. 175, No. 18.

Baier, J., et al., "Planning with Preferences", AI Magazine, 2008, pp. 25-36.

Baier, J., et al., "A heuristic search approach to planning with temporally extended preferences", Artificial Intelligence, 2009, pp. 593-618, vol. 173.

Bauer, A., et al., "Alarm Processing with Model-Based Diagnosis of Event Discrete Systems", Proceedings of the 22nd International Workshop on Principles of Diagnosis, 2011, pp. 52-59.

Benton, J., et al., "Temporal Planning with Preferences and Time-Dependent Continuous Costs", Proceedings of the 22nd International Conference on Automated Planning and Scheduling, 2012, pp. 1-9.

Blum, A., et al., "Fast planning through planning graph analysis", Artificial Intelligence, 1997, pp. 281-300, vol. 90.

Bonet, B., et al., "Planning as heuristic search", Artificial Intelligence, 2001, pp. 5-33, vol. 129, Nos. 1-2.

Botea, A., "Ultra-Fast Optimal Pathfinding without Runtime Search", Proceedings of the Seventh AAAI Conference on Artificial Intelligence and Interactive Digital Entertainment, 2011, pp. 1-6.

Botea, A., et al., "Path Planning with Compressed All-Pairs Shortest Paths Data", Proceedings of the Twenty-Third International Conference on Automated Planning and Scheduling, 2013, pp. 293-297.

Bouillet, E., et al., "MARIO: Middleware for Assembly and Deployment of Multi-platform Flow-Based Applications", Middleware, pp. 1-7, vol. 26.

Boutiller, C., et al., "CP-nets: A Tool for Representing and Reasoning with Conditional Ceteris Paribus Preference Statements", Journal of Artificial Intelligence Research, 2004, pp. 135-191, vol. 21, AI Access Foundation and Morgan Kaufmann Publishers.

Cordier, M., et al., "Event-Based Diagnosis for Evolutive Systems", Publication Interne N 819, May 1994, pp. 1-21.

Do, Minh, et al., "Planning with Goal Utility Dependencies", Proceedings of the 20th International Joint Conference on Artificial Intelligence, 2007, pp. 1872-1878.

Dvorak, D., et al., "Model-Based Monitoring or Dynamic Systems", Knowledge Representation, 1989, pp. 1238-1243.

Dvorak, D., et al., "Process Monitoring and Diagnosis: A Model-Based Approach", IEEE Expert, pp. 76-74, Jun. 1991, vol. 6, No. 3.

Edelkamp, S., et al., "Optimal Symbolic Planning with Action Costs and Preferences", Proceedings of the 21st International Joint Conference on Artificial Intelligence, 2009, pp. 1690-1695.

Edelkamp, S., et al., "Cost-Optimal Planning with Constraints and Preferences in Large State Spaces", Computer Science Department, University of Dortmund, Dortmund, Germany, 2006, pp. 1-8.

Eppstein, D., "Finding the k Shortest Paths", SIAM Journal on Computing, 1998, pp. 652-673, vol. 28, No. 2.

Gerevini, A., et al., "Deterministic planning in the fifth international planning competition: PDDL3 and experimental evaluation of the planners", Artificial Intelligence, 2009, pp. 619-668, vol. 173.

Ghallab, M., et al., "Automated Planning: theory and practice", 2004, pp. 27-41, Morgan Kaufmann Publishers.

Goebelbecker, M., et al., "Coming up With Good Excuses: What to do When no Plan Can be Found", Proceedings of the 20th International Conference on Automated Planning and Scheduling, 2010, pp. 81-88.

Goldman, R., et al., "A New Model of Plan Recognition", UAI, 1999, pp. 245-254.

Grastein, A., et al., "Diagnosis of Discrete-Event Systems Using Satisfiability Algorithms", Proceedings of the 22nd National Conference on Artificial Intelligence, 2007, pp. 305-310.

(56) References Cited

OTHER PUBLICATIONS

Grastein, A., et al., "Exhaustive Diagnosis of Discrete Event Systems through Exploration of the Hypothesis Space", Proceedings of the 22nd National Conference on Artificial Intelligence, 2011, pp. 1-8.
Haslum, P., et al., "Diagnosis as Planning: Two Case Studies", International Scheduling and Planning Applications Workshop (SPARK), 2011, pp. 27-44.
Hoffman, W., et al., "A Method for the Solution of the Nth Best Path Problem", Journal of the ACM, 1959, pp. 506-514, vol. 6, No. 4.
Hoffmann, J., et al., "The FF Planning System: Fast Plan Generation Through Heuristic Search", Journal of Artificial Intelligence Research, 2001, pp. 253-302, vol. 14.
Hsu, C., et al., "Constraint Partitioning for Solving Planning Problems with Trajectory Constraints and Goal Preferences", IJCAI, 2007, pp. 1924-1929.
Kambhampati, S., "Model-lite Planning for the Web Age Masses: The Challenges of Planning with Incomplete and Evolving Domain Models", Proceedings of the 22nd National Conference on Artificial Intelligence, 2007, pp. 1601-1604.
Keyder, E., et al., "Soft Goals Can be Compiled Away", Journal of Artificial Intelligence Research, Dec. 2009, pp. 547-556, vol. 96.
Lin, N., et al., "Web Service Composition with User Preferences", S. Bechofer et al. (Eds.): ESWC2008, LNCS 5021, 2008, pp. 629-643.
McDermott, D., et al., "PDDL—The Planning Domain Definition Language", Tech Report CVC TR-98-003/DCS TR-1165, Oct. 1998, pp. 1-27.
McIlraith, S., "Towards a Theory of Diagnosis, Testing and Repair", Proceedings of the 5th International Workshop on Principles of Diagnosis, 1994, pp. 185-192.
Mohanta, K., "Comprehensive Study on Computational Methods for K-Shortest Paths Problem", International Journal of Computer Applications, Feb. 2012, pp. 22-26, vol. 40, No. 14.
Myers, K., et al., "Generating Qualitatively Different Plans through Metatheoretic Biases", Proceedings of the 16th National Conference on Artificial Intelligence (AAAI), 1999, pp. 570-576.
Nguyen, T., et al., "Generating diverse plans to handle unknown and partially known user preferences", Artificial Intelligence, 2012, pp. 1-31, vol. 190.
Ramirez, M., et al., "Plan Recognition as Planning", Proceedings of the 21st International Joint Conference on Artificial Intelligence, 2009, pp. 1776-1783.
Riabov, A., et al., "New Algorithms for the Top-K Planning Problem", IBM T.J. Watson Research Center. Yorktown Heights, NY, pp. 1-7.
Richalet, J., "Industrial Application of Model Based Predictive Control", Automatica, 1993, pp. 1251-1274, vol. 29, No. 5.
Richter, S., et al., "Landmarks Revisited", Proceedings of the Twenty-Third AAAI Conference on Artificial Intelligence, 2008, pp. 975-982.
Richter, S., et al., "The LAMA Planner: Guiding Cost-Based Anytime Planning with Landmarks", Journal of Artificial Intelligence Research, Oct. 2010, pp. 127-177, vol. 39.
Sampath, M., et al., "Diagnosability of Discrete-Event Systems", IEEE Transactions on Automatic Control, Sep. 1995, pp. 1555-1575, vol. 40, No. 9.
Sohrabo, S., et al., "Composition of Flow-Based Applications with HTN Planning", Problem Solving Using Classical Planners, AAAI Technical Report WS-12-12, pp. 58-64.
Sohrabi, S., et al., "Diagnosis as Planning Revisited", Proceedings of the Twelfth International Conference on the Principles of Knowledge Representation and Reasoning, 2010, pp. 26-36.
Sohrabi, S., et al., "HTN Planning with Preferences", Proceedings of the 21st International Joint Conference on Artificial Intelligence, 2009, pp. 1790-1797.
Sohrabo, S., et al., "Hypothesis Exploration for Malware Detection using Planning", Proceedings on the Twenty-Seventh AAAI Conference on Artificial Intelligence, 2013, pp. 883-889.
Sohrabi, S., et al., "Preferred Explanations: Theory and Generation via Planning", Proceedings of the Twenty-Fifth AAAI Conference on Artificial Intelligence, 2011, pp. 261-267.
Sohrabi, S., et al., "Web Service Composition via Generic Procedures and Customizing User Preferences", The Semantic Web—ISWC 2006, Lecture Notes in Computer Science, 2006, pp. 597-611, vol. 4723.
Srivastava, B., et al., "Domain Independent Approaches for Finding Diverse Plans", Proceeding of the 20th International Joint Conference on Artificial Intelligence (IJCAI-07), 2007, pp. 2016-2022.
Sohrabi S., Udrea, O., Ranganathan, A. Composition of Flow-Based Applications with HTN Planning. International Scheduling and Planning Applications workshop, 2012, 1-7. Retrieved from http://researcher.ibm.com/researcher/view_pubs.php?persons=us-ssohrab&t=1.
Sohrabi, S., Udrea, O., Ranganathan, A. Composition of Flow-Based Applications with HTN Planning. International Scheduling and Planning Applications workshop, 2012, pp. 1-7. Retrieved from http://researcher.ibm.com/research/view_pubs.php?person=us-ssohrab&t=1.
Nguyen et al., Generating diverse plans to handle unknown and partially known user preferences, Jun. 18, 2012. Artificial Intelligence 190 (2012) pp. 1-31.
Yoo., T., et al., "Stochastic Event Counter for Discrete-Event Systems Under Unreliable Observations", 2008 American Control Conference, INL/CON07-13239 Preprint, Jun. 2008, pp. 1-9.
Yen, J., "Finding the K Shortest Loopless Paths in a Network", Management Science, Jul. 1971, pp. 712-716, vol. 17, No. 11.
Ghallab et al., excerpts from "Automated Planning", 2004, pp. 1-30, Morgan Kaufmann Publishers, San Francisco, CA.
Office action mailed Nov. 29, 2016; U.S. Appl. No. 14/283,867; pp. 1-9.
List of IBM Patents or Applications Treated as Related, pp. 1-2.
Sohrabi, S., Udrea, O., Ranganathan, A. Composition of How-Based Applications with HTN Planning. International Scheduling and Planning Applications workshop, 2012, 1-7, Retrieved from http://researcher.ibm.com/researcher/view_pubs.php?person=us-ssohrab&t=1.
Nguyen et al., Generating diverse plans to handle unknown and partially known user preferences, Jun. 18, 2012. Artificial Intelligence 190 (2012) 1-31.
Yoo., T., et al,, "Stochastic Event Counter for Discrete-Event Systems Under Unreliable Observations", 2008 American Control Conference, INL/CON07-13239 Preprint, Jun. 2008, pp. 1-9.
"Google Maps", http://www.google.com/maps/©31.168934,-100.0768425,6z, retrieved Sep. 11, 2014, 1 page.
Aljazzar, Husain eet al., "K: A Heuristic Search Algorithm for Finding the k Shortest Paths", Artificial Intelligence, Jul. 14, 2011, 39 pages.
Aslam, Javed A. et al.. "The Star Clustering Algorithm for Static and Dynamic Information Organization", journal of Graph Algorithms and Applications, vol. 8, No. 1, Revised Aug. 2004, pp. 95-129.
Botea, Adi et al., "Path Planning with Compressed All-Pairs Shortest Paths Data", Proceedings of the Twenty-Third International Conference on Automated Planning and Scheduling (ICAPS). http:www.aaai.orgiocs/index.php/ICAPS/ICAPS13/paper/viewFile/6002/6191, Rome, Italy, Jun. 10-14, 2013, 293-297.
Bryce, Daniel, "Landmark-Based Plan Distance Measures for Diverse Planning", Proceedings of the International Conference on Automated Planning and Scheduling (ICAPS), Portsmouth, New Hampshire, Jun. 21-26, 2014, pp. 56-64.
Chaudhuri, Surajit et al., "Robust and Efficient Fuzzy Match for Online Data Cleaning", SIGMOD 2003, San Diego, California, Jun. 9-12, 2003, 12 pages.
Oman, Alexandra et al., "Generating Diverse Plans Using Quantitative and Qualitative Plan Distance Metrics", Proceedings of the Twenty-Fifth AAAI Conference on Artificial Intelligence, San Francisco, California, Aug. 7-11, 2011, pp. 946-951.
Eppstein, David, "Finding the k Shortest Paths", Department of Information and Computer Science, http://www.ics.uci.edu/~eppstein/pubs/Epp-SJC-98.pdf, Mar. 31, 1997, 26 pages.
Filippone, Maurizio et al., "A survey of kernel and spectral methods for clustering", Pattern Recognition, vol. 11, Issue 1, http://lagis-

(56) References Cited

OTHER PUBLICATIONS vi.univ-lilletfri-lmiclasspec/publi_classiff/A_survey_of_kernel_and_spectral_methods_for_clustering_PR_2008.pdf, Jan. 2008, pp. 176-190.

Hassanzadeh, Oktie et al., "Creating probabilistic databases from duplicated data", VLDB Journal, vol. 18, No. 5, Oct. 2009, pp. 1141-1166.

Hassanzadeh, Oktie et al., "Framework for Evaluating Clustering Algorithms in Duplicate Detection", VLDB'09, Lyon, France, Aug. 24-28, 2009, 12 pages.

Hoffman, Walter et al., "A Method for the Solution of the Nth Best Path Problem", Journal of the ACM, vol. 6 (4), Oct. 1959, pp. 506-514.

Khouadjia, Mostepha et al., "Pareto-Based Multiobjective Al Planning", Proceedings of the Twenty-Third International Joint Conference on Artificial intelligence, Beijing, China, Aug. 3-9, 2013, pp. 2321-2327.

Myers, Karen L et al., "Generating Qualitatively Different Plans through Metatheoretic Biases", In Proceedings of the 16th National Conference on Artificial Intelligence, (AAAI-99), Orlando, Florida, Jul. 18-22, 1999, 7 pages.

Nau, Dana S. et al., "Automated Planning—Theory and Practice", http://www.cs.umd.edu/~nau/planning/slides/, Elevier, May 2004, 1 page.

Nguyen, Tuan A. et al., "Generating diverse plans to handle unknown and partially known user preferences", Artificial Intelligence (AIJ), vol. 190, Oct. 2012, pp. 1-31.

Riabov, Anton V. et al., "New Algorithms for the Top-K Planning Problem", Proceedings of the Scheduling and Planning Applications Workshop (SPARK) at the 24th International Conference on Automated Planning and Scheduling (ICAPS), Jun. 21-26, 2014, 7 pages.

Roberts, Mark et al., "Evaluating Diversity in Classical Planning", Proceedings of the 24th International Conference on Automated Planning and Scheduling (ICAPS), Portsmouth, New Hampshire, Jun. 21-26, 2014, 9 pp.

Sohrabi, Shirin et al., "Hypothesis Exploration for MAlware Detection using Planning", Proceedings of the Twentieth International Joint Conference on Artificial Intelligence, IJCAI-07, Hyderabad, India, Jan. 6-12 2007, 7 pages.

Srivasta, Biplav et al., "Domain Independent Approaches for Finding Diverse Plans", Proceedings of the Twentieth International Joint Conference on Artificial Intelligence, IJCAI-07, Hyderabad, India, Jan. 6-12 2007, 7 pages.

Sroika, Michal et al., "Exploring Metric Sensitivity of Planners for Generation of Pareto Frontiers", In Proc. of the 6th Starting AI Researchers' Symposium (STAIRS), Aug. 2012, pp. 306-317.

Xu, Rui et al., "Survey of Custering Algorithms", IEEE Transactions on Neural networks, vol. 16, No. 3, May 2005, pp. 645-678.

Youngren, Mark A. et al., "The Future Theater-Level Model: A Research Project Update", Proceedings of the 1994 Winter Simulation Conference; http://www.informs-sim.org/wsc94papers/1994_0121.pdf, Orlando, Florida, Dec. 11-14, 1994, pp. 829-834.

Zhu, Andy D. et al., "Shortest Path and Distance Queries on Road Networks: Towards Bridging Theory and Practice", arXiv:1304.2576v2 [cs.DS], http://arxiv.org/pdf/1304.2576v2.pdf, Apr. 24, 2013, 22 pages.

Office action mailed Oct. 31, 2016; U.S. Appl. No. 14/525,790; pp. 1-8.

Office action mailed Nov. 22, 2016; U.S. Appl. No. 14/745,899; pp. 1-8.

\* cited by examiner

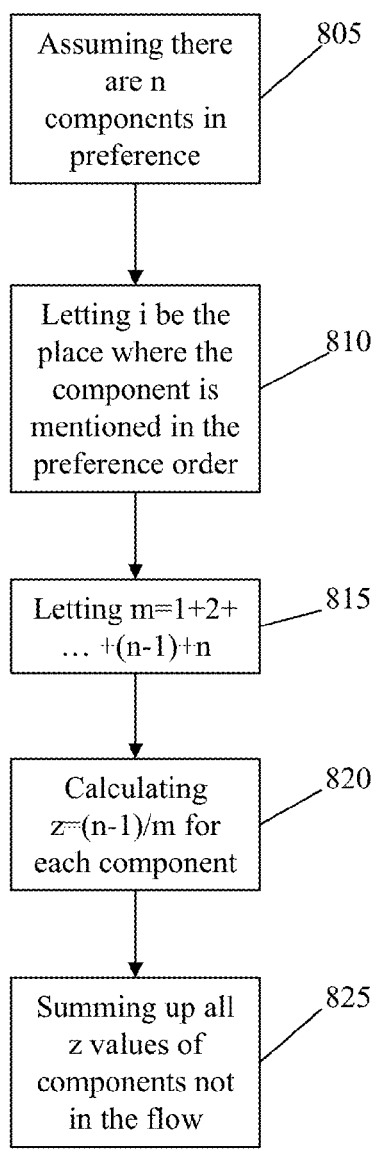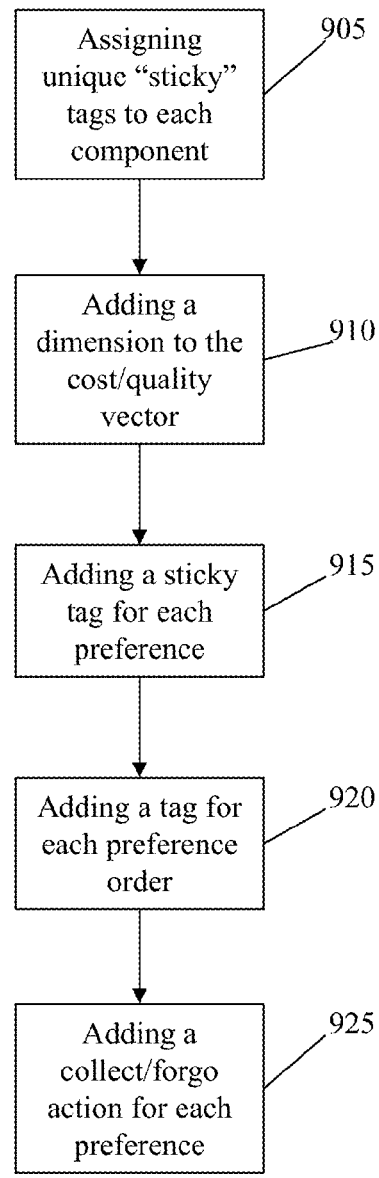
FIG. 8
FIG. 9

GOAL-DRIVEN COMPOSITION WITH PREFERENCES METHOD AND SYSTEM

STATEMENT REGARDING FEDERALLY SPONSORED RESEARCH OR DEVELOPMENT

This invention was made with Government support under Contract No.: H98230-11-C-0276 awarded by Department of Defense (DOD). The Government has certain rights in this invention.

SUMMARY OF THE INVENTION

The invention in at least one embodiment includes a method for operation of a system for determining a set of plans that best match a set of preferences including: receiving into a goal specification interface at least one goal to be accomplished by the set of plans; receiving into a preference engine a pattern that includes preferences from at least one user; generating a planning problem based on the received at least one goal and the received pattern by using the preference engine; generating a set of plans by using at least one planner; and providing the set of plans for selection of one plan to deploy.

In a further embodiment, the preferences include at least one of the following: an occurrence of at least one component, a non-occurrence of at least one component, an occurrence of at least one component over at least one other component, an ordering between at least two components, an existence of at least one tag in a final stream, an existence of at least one tag over at least one other tag in the final stream, and a non-existence of at least one tag in the final stream. In a further embodiment to the first embodiment, each preference is at least one of: an occurrence of at least one component within a flow, a non-occurrence of at least one component, an occurrence of one component over at least one other component, a temporal relation between at least two components, a temporal relation over tags, a temporal relation ranking of components, a temporal relation ranking of tags, and an existence of a tag or a preference over tags.

In a further embodiment to any of the previous embodiments, generating the planning problem includes providing the planning problem to at least one planner. In a further embodiment to any of the above embodiments, the set of plans includes the top-k plans. Further to the previous embodiment, k is a predetermined constant. In a further embodiment to either of the previous two embodiments, generating the set of plans includes using the preferences to determine which plans best match the preferences using for each plan found by the planner a sum of a satisfaction number for each preference with the top-k plans being the k plans with the lowest sums. In a further embodiment to the previous embodiment, at least one of the satisfaction number for each preference is modified by a multiplier representing a priority level of the preference and each preference has the same range of preference values that provide the satisfaction number of the satisfaction numbers. In a further embodiment to either of the previous embodiment, the preference value range is zero to one. In a further embodiment to any of the previous three embodiments, the method further including determining the satisfaction number for a multiple component preference order by setting i equal to n−1 where n is a number of components in the preference order, wherein i is the nth component and 0 is the first component, setting m equal to the summation of 1 to n, for each component calculate z equal to (n−i)/m, and sum up all z values of components that did not appear in the plan to obtain the satisfaction number.

In a further embodiment to any of the previous embodiments, where the method further including updating the planning problem with the preference engine by adding a dimension to a cost/quality vector where the dimension will be used for preference satisfaction times a multiplier, adding a sticky tag for each preference being added to the planning problem, adding a tag for each preference being added to the planning problem, and adding a collect/forgo action for each preference being added to the planning problem. In a further embodiment to the previous embodiment, where updating further includes assigning a unique sticky tag to each component.

The invention in at least one embodiment includes a computer program product for finding a set of plans that reach a goal based on a set of preferences, the computer program product including: a computer readable storage medium having encoded thereon: first program instructions executable by a processor to cause the processor to receive at least one goal to be accomplished by the set of plans; second program instructions executable by a processor to cause the processor to receive a pattern that includes preferences from at least one user, where the preferences include at least one of the following: an occurrence of at least one component, a non-occurrence of at least one component, an occurrence of at least one component over at least one other component, an ordering between at least two components, an existence of at least one tag in a final stream, an existence of at least one tag over at least one other tag in the final stream, and a non-existence of at least one tag in the final stream; third program instructions executable by a processor to cause the processor to generate a planning problem based on the received at least one goal and the received pattern; fourth program instructions executable by a processor to cause the processor to generate a set of plans for the generated planning problem; and fifth program instructions executable by a processor to cause the processor to provide the set of plans for selection of one plan to deploy. In a further embodiment to the previous embodiment, the set of plans includes the top-k plans where k is a predetermined constant. In a further embodiment to the previous embodiment, the fourth program instructions uses the preferences to determine which plans best match the preferences using for each plan found by the planner a sum of a satisfaction number for each preference with the top-k plans being the k plans with the lowest sums. In a further embodiment to the previous embodiment, the satisfaction number for each preference is modified by a multiplier representing a priority level of the preference. In a further embodiment to either of the previous embodiments, the preference value range is zero to one. In a further embodiment to any of the other embodiments in this paragraph, the computer readable storage medium further having encoded thereon: sixth program instruction executable by a processor to cause the processor to update the planning problem by adding a dimension to a cost/quality vector where the dimension will be used for preference satisfaction times a multiplier, adding a sticky tag for each preference being added to the planning problem, adding a tag for each preference being added to the planning problem, and adding a collect/forgo action for each preference being added to the planning problem.

The invention in at least one embodiment includes a system including: a preference engine configured to receive at least one goal and a set of preferences from a plurality of users; a planner in communication with the preference engine and configured to produce top-k plans that best match the set of preferences and the at least one goal received from the preference engine; a deployment engine in communication with the planner and configured to interact with at least one user for selection of the plan to be deployed by the deployment engine; and at least one database in communication with the preference engine and the planner, the at least one database storing for each preference a preference value and a priority multiplier.

BRIEF DESCRIPTION OF DRAWINGS

The present invention is described with reference to the accompanying drawings. In the drawings, like reference numbers indicate identical or functionally similar elements.

FIG. 8 illustrates a method according to at least one embodiment of the invention.

FIG. 9 illustrates a method according to at least one embodiment of the invention.

DETAILED DESCRIPTION

Figure 1:
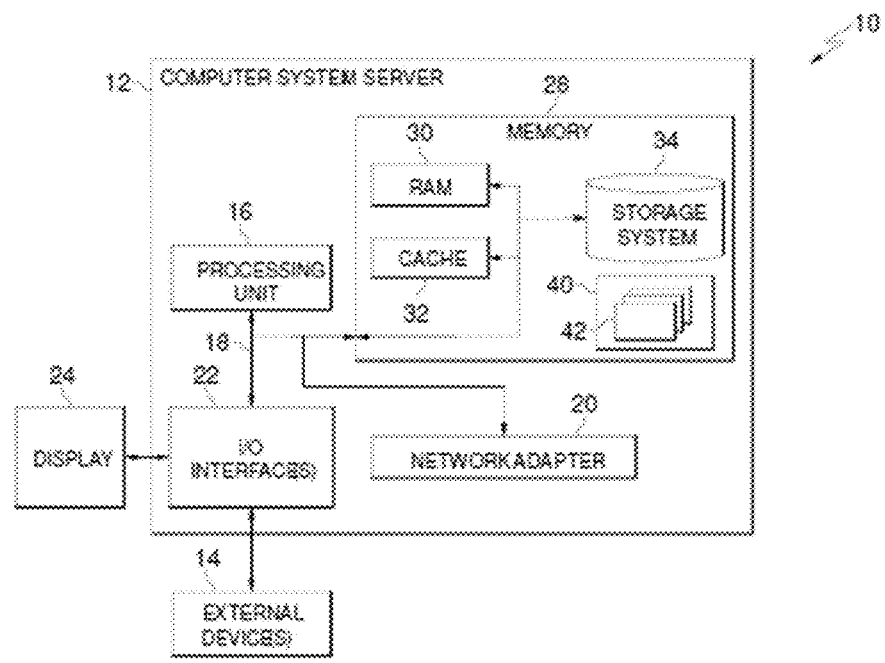
FIG. 1 illustrates a cloud computing node according to an embodiment of the present invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
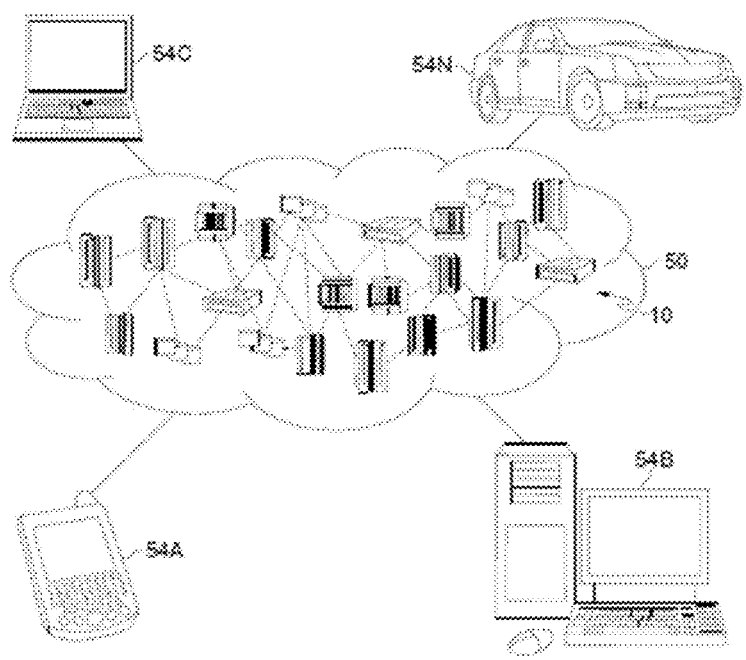
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
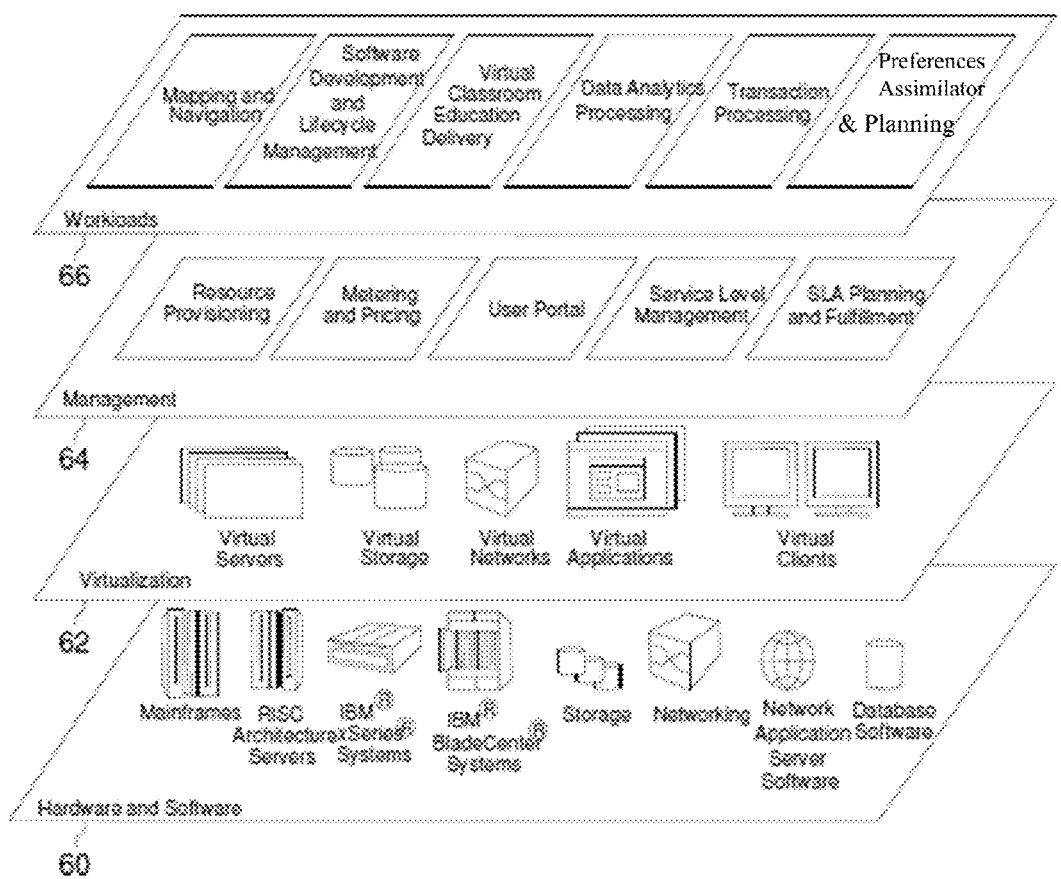
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided: Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; preference assimilation; and planning.

The invention in at least one embodiment relates to the field of automated Artificial Intelligence (AI) planning and an overview of such automated planning will be provided. Further information regarding automated planning can be found, for example, in Ghallab et al., "Automated Planning—Theory and Practice" (2004).

A planning problem consists of the following main elements: a finite set of facts, the initial state (a set of facts that are true initially), a finite set of action operators, and the goal condition. An action operator (or planning action) maps a state into another state. In classical planning, the objective is to find a sequence of action operators which when applied to the initial state, will produce a state that satisfies the goal condition. This sequence of action operators is called a plan. In at least one embodiment of the invention, high-quality plans are found instead of just any plan and the set of action operators may have numerical costs associated with them.

In classical setting, quality often means the shortest plan so that the quality of a plan is measured based on the number of actions in the plan. Therefore, the best quality plan, or the optimal plan, often means a plan with smallest number of action operators. According to at least one embodiment, the quality of the plan is measured based on the sum of the cost of the actions in the plan. Hence, a plan with minimum action costs is the highest-quality plan. According to at least one embodiment, the planner finds top-quality or near top-quality plans. That is it finds plans with minimum cost or close to minimum cost. In the case of top-K quality plans, the planner finds k top-quality plans with respect to the plan costs. In a further embodiment, a plan that satisfies the set of preferences as much as possible is deemed to be a high-quality plan.

As we will discuss in this disclosure, the approach in addressing the preferences is to take the non-classical planning problem or the planning with the preference problem and compile it into a planning problem where some planning actions have costs associated with them. Doing so allows the system to reason with action costs and use existing planners capable of addressing action cost in order to handle the preferences.

The invention in at least one embodiment includes a system and a method for allowing a set of users to request particular preferences be considered in finding a set of plans, which in at least one further embodiment are the top-k plans, to reach a goal. In at least one embodiment, the top-k plans are plans that have are high-quality plans or the plans that best match the preference set, and where k is a predetermined number; but in at least one embodiment the value k may be set or changed during the performance of the method. In a further embodiment, the set of users provide the preferences in a syntax that is adapted by the system into the planning problem for use by at least one planner. In at least one embodiment, the system includes a preference engine to receive the preferences and to adapt them to the planning problem including assigning any weights that may be predetermined for the syntax that is used for the received preferences. In at least one embodiment, the set of users is just one user.

In at least one embodiment, the preferences can be specified on different parts of the pattern by the set of users. Different users may impose preferences to specify further quality criteria on the candidate patterns. These preferences can, for example, be learned from history of user interactions, from users knowledge of the domain, or drawn from a default library.

In at least one embodiment for how the preferences are provided, the preferences are encoded on top of the pattern language by the set of users such that the preferences are translated (or compiled away) into the planning problem. When the encoded preferences are compiled away, this permits the system to reason about preferences while using an existing planner by, in at least one embodiment, incorporating a notion of preference satisfaction on top of it. The notion of preferences allows the planner to generate plans according to the degree of satisfaction of the given preferences and in at least one embodiment the quality of the plan.

Figure 4:
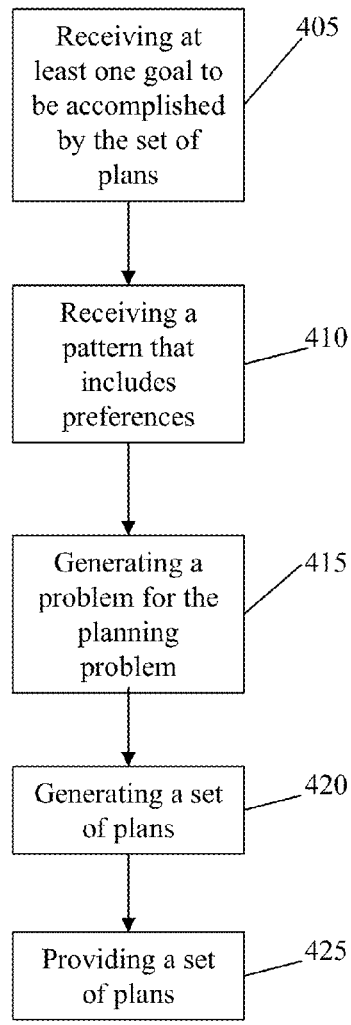
FIG. 4 illustrates a method according to at least one embodiment of the invention.
Figure 5:
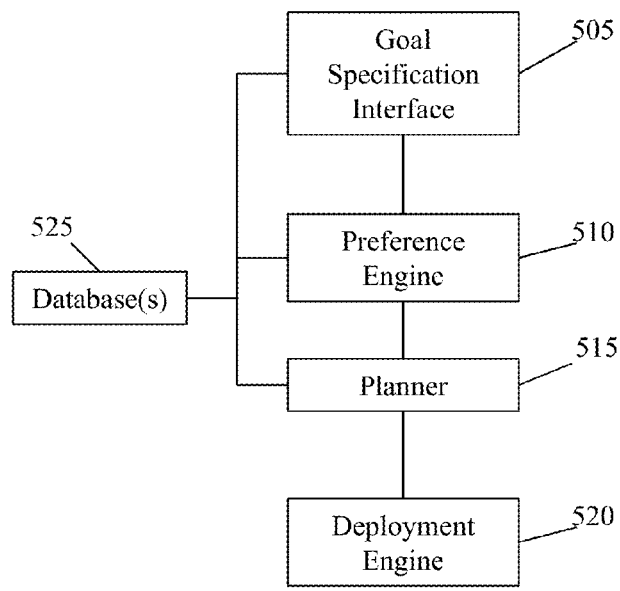
FIG. 5 illustrates a block diagram of a system according to at least one embodiment of the invention.

FIG. 4 illustrates a method according to at least one embodiment of the invention, while FIG. 5 illustrates a system according to at least one embodiment of the invention. The system through, for example, a goal specification interface 505 receives at least one goal to be accomplished by the set of plans, 405. A preference engine 510 receives a pattern that includes preferences from at least one user, 410. The preference engine 510 generates a planning problem based on the goals and the pattern, 415. In at least one embodiment, generation of the planning problem includes providing the result to at least one planner 515. The planner 515 generates a set of plans, 420, which in at least one embodiment are the top-k plans with respect to the preferences (or quality criteria) specified in the pattern. The planner 515 provides the set of plans to a deployment engine 520 for selection of a plan to deploy, 425.

In a further embodiment, the planner 515 ranks the plans based on their quality with respect to the preferences. In a further embodiment, the preferences are stored in at least one database 525 in communication with the preference engine 510 and in a further embodiment the at least one database 525 is also in communication with the goal specification interface 505 and the planner 515.

In an alternative embodiment, the goal specification interface is part of the preference engine.

As will be developed in more detail later in illustrative examples, the preferences are used by the planner to determine which plans to reach a particular goal are better than other plans based on how well the plans match the set of preferences. In at least one further embodiment there may be contradictory preferences present in the set, which are able to be handled by the system both locally specified preferences and reasons about them at the global level. In an alternative embodiment, the satisfaction of tag-based goals is considered by the planner in organizing the plans in addition to the satisfaction of the received preferences.

In at least one embodiment, each preference has a sum of its components providing a preference value that is the same irrespective of the preference contents. In at least one embodiment, the preference value is 1. In alternative embodiments, the preference value is 2, 5, 10, 20, 25, 50, 100 or any other integer value. For example, if the preference is for X, then the non-presence of X would be the preference value that would be added to the plan while if X is present, then zero would be the value added to the plan. Another example, if the preference is for X or Y, then the presence of one or the other will provide a number between zero and the preference value and in an alternative embodiment the range includes one or both of the end points. The level of satisfaction of a plan against a particular preference provides a satisfaction number that ranges between zero and preference value and in an alternative embodiment the range includes one or both of the end points. The plan with the lowest sum of satisfaction numbers (or metric) is the top plan, because it best satisfies the set of preferences. In an alternative embodiment, a reverse scale is used where if the preference is met then the preference value is added to the plan such that the plan with the highest sum of preference values is the plan with the best match of the set of preferences. In a further alternative embodiment, a scale is used that extends partially into negative numbers for any of the preference value embodiments.

In a further embodiment, the preference value is modified by an importance value (or multiplier) where the importance value is a predetermined value based on the rating of importance of the preference such as high, medium, and low. The importance value in at least one embodiment is a multiplier that is predetermined and assigned based on the importance. In at least one embodiment, the importance value is a number (or alternatively a fraction) less than the preference value being used and in a further embodiment the importance value is a number (or alternatively a fraction) less than or equal to 1. In an alternative embodiment, the importance value is just predetermined and as such it is possible for it to be greater than the preference value or 1.

In at least one embodiment, the preferences include at least one of the following: an occurrence of a component(s), a non-occurrence of a component(s), an occurrence of one component over another component, an ordering between the components (or temporal relationship of components), an existence of a tag in the final stream, an existence of one tag over another tag in the final stream, and a non-existence of a tag in the final stream. In an alternative embodiment, one or more of these may be omitted from the list.

In an alternative embodiment, the planner ranks the found plans based on the cost and the preference value of the plan to allow for consideration of the cost of the planning actions that make up a particular plan. In at least one embodiment, this is accomplished by determining the number of preferences in the planning problem to normalize the resulting preference value to a predetermined range for consideration by the planner in addition to the cost of planning actions. The weighting that is between the preference value and the cost of planning actions in at least one embodiment varies based on the particular implementation.

For the purposes of this disclosure and the illustrative examples present in this disclosure, an overview regarding the Cascade language will be provided. The Cascade language provides a description of patterns that is compiled into a planning problem encoded in a planning domain description language, for example, Stream Processing Planning Language (SPPL) for use in a planner, which in at least one embodiment is a planner that given a specific goal description using pre-defined tags will produce a plan that satisfies the goal. However, in many situations the goal may be ambiguous or many plans can be found for the same goal.

The Cascade language has been proposed for describing data flow patterns that can guide automated software composition, and as an alternative to the lower-level planning languages that are difficult to use as part of software development cycle. Cascade has a programming language syntax that is friendly to software developers, includes integrated development tools, and can be used with different execution environments.

An important example of an execution environment is stream-processing middleware (for example, IBM InfoSphere Streams), which facilitates the development of distributed applications that must process high volumes of data in memory. Stream processing applications are constructed as data flow graphs composed of modular software components that communicate via data streams, and described in a programming language such as Streams Processing Language (SPL). The middleware deploys the components of the application across multiple hardware nodes within a dedicated stream processing cluster, manages them and provides efficient data transport. Cascade flow patterns define the space of valid composed flows, which are then mapped to stream processing data flow graphs in SPL.

In the following illustrative examples, reference will be made to FIG. 6 that illustrates a Cascade pattern for a stream processing application from the financial domain. Based on this disclosure, one of ordinary skill in the art should appreciate how to use the teachings of this disclosure in other domains and languages.

Figure 6:
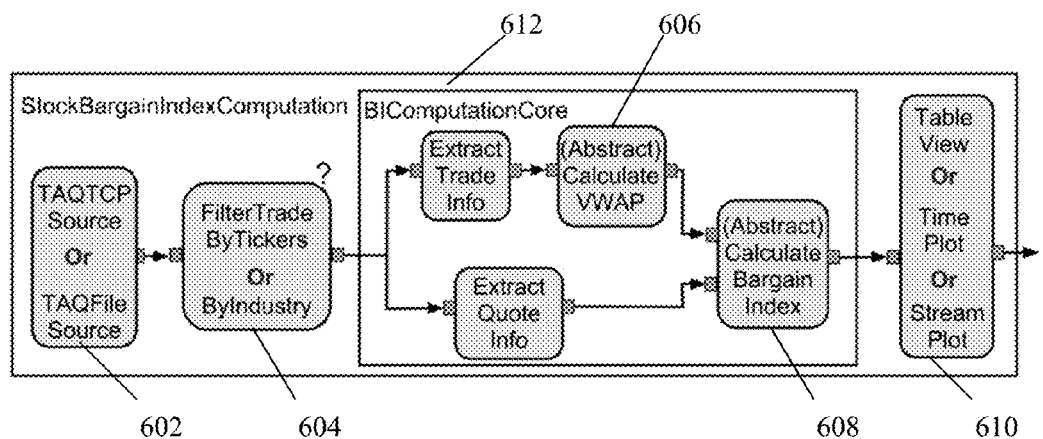
FIG. 6 illustrates an example of a Cascade pattern for a stream processing application from the financial domain.

The illustrated implementation in FIG. 6 helps financial experts decide whether a current price of a stock is a bargain. The main component is called StockBargainIndexComputation and is used to define the root or the top-level component. The flow pattern describes how the data is obtained from sources, processed by components, and visualized in different ways. Source data (Trade and Quote (TAQ) 602) can, for example, be received either live or replayed from a file. This data can be filtered according to a set of tickers or according to a specified industry or neither, as the filter components 604 are optional (indicated by the ?). The Volume-Weighted Average Price (VWAP) and the Bargain Index (BI) calculations can be performed by a variety of concrete components which inherit from abstract components CalculateVWAP 606 and CalculateBargainIndex 608. The results can be visualized, for example, using a table, a time-plot or a stream-plot 610.

A single flow pattern defines a number of actual flows. That is, a Cascade flow pattern describes a set of flows by specifying different possible structures of flow graphs and possible components that can be part of the graph.

A flow pattern in Cascade is a tuple F=(G(V, E), M), where G is a directed acyclic graph, and M is called the main composite. Each vertex, v∈V, can be the invocation of one or more of the following: (1) a primitive component, (2) a composite component, (3) a choice of components, (4) an abstract component with descendants, (5) a component, optionally. Each directed edge, e∈E in the graph represents the transfer of data from an output port of one component to the input port of another component. Throughout this disclosure, this disclosure will refer to edges as streams, outgoing edges as output streams, and ingoing edges as input streams. The main composite, M, defines the set of allowable flows.

Components in Cascade can have zero or more input ports and one or more output ports. A component can be either primitive or composite. A primitive component is an atomic element of the flow graph, and is usually associated with a code fragment, which is used in code generation during flow graph deployment. A composite component internally defines a flow of other components. In FIG. 6, the TableView 610 and BICompoutationCore 612 are examples of primitive and composite components respectively.

Similarly, an abstract component includes the declaration of inputs and outputs, but without a code fragment or a graph. Instead, separately defined concrete components can be declared to implement an abstract component. Note a concrete component can be primitive or composite. Including an abstract component within a graph pattern (i.e., a composite) defines a point of variability of the graph, allowing any implementation of the abstract to be used in place of the abstract.

Cascade includes two more constructs for describing graph variability. The choice invocation can be used to enumerate several alternatives to be used within the same location in the graph. For example, the pattern in FIG. 6 defines a choice 602 between TCP source and file source. The alternatives must have the same number of inputs and the same number of outputs. Any component contained within the optional invocation becomes optional. For example, in FIG. 6 the choice between trade filters 604 "ByTickers" and "ByIndustry" is made optional, allowing graphs that include no filters at all to be valid instantiations of this pattern.

In Cascade, output ports of components can be annotated with user-defined tags to describe the properties of the produced data. Tags can be any keywords related to terms of the business domain. The tags that are used to annotate output ports can be described as "sticky tags". This is because if any output port is annotated by a tag, then all downstream data links in a flow are also annotated by this tag, unless another component explicitly removes this tag.

Tags are used by the end-user to specify the composition goals, which in this illustrative example are referred to as the Cascade goals. For each graph composed according to the pattern, tags associated with output streams are propagated downstream, recursively associating the union of all input tags with outputs for each component. Cascade goals specified by end users are then matched to the description of a graph output. Graphs that include all goal tags become candidate flows for the goal. For example, if the output port of the FilterTradeByIndustry component is annotated with the tag ByIndustry, there would be 2*5*5*3=150 candidate flows for the Cascade goal ByIndustry.

With the above overview in mind, the following is a discussion of an illustrative example of how the syntax of the proposed preference language works in at least one embodiment. The examples of each type of preferences will be discussed with respect to FIG. 6. The examples for the purposes of illustration are written in the syntax of the Cascade language.

In at least one embodiment, there are five different classes of preferences: 1) component occurrence, 2) component ranking, 3) temporal relation preference, 4) temporal relation ranking, and 5) tag preferences. Preferences of types 1-4 are specified directly on top of the Cascade language using directives, while preferences of type 5 are specified in a separate file together with specification of tag taxonomies (the set of all tags and their relationship with each other).

Users can specify a preference of a component type to increase the chances that a particular component is invoked within a flow. This can be done in the head of component C definition along with other defined metadata for component C. However in at least one embodiment, it must be the case that either C is an abstract component and the preference is for one of the concrete components of C, or C is a composite component and the preference is for one of the components mentioned within the body of C either directly or indirectly.

The following is an example of the syntax for component occurrence preferences. Note that in the above example compA is mentioned in the component body. The example is as follows:

```
/#*
@type "spl"
@tags K tag1 tag2
@tags L tag3
@prefer_component compA    // specification of component occurrence
preferences *#/
Composite M (output K, L; input G, H){
<component body>
}
```

The above indicates a preference for compA. This is done within the head of a composite component named M. One can also indicate a preference for not having a component within the flow. This can be done by specifying "~" before the name of the component. So for example, one can state: @prefer_component~compA Note that if component M is not selected to be part of the flow, then the preference for compA will be treated as satisfied. In other words, this type of preferences is conditioned upon the occurrence of component M or the place when the preference is defined.

Finally, one can specify multiple preferences of this type in the metadata. For example, one can specify both @prefer_component compA and @prefer_component compB on component M's metadata. These two would be treated as equally preferred. If one would like to indicate that compA is more preferred than compB, then they would need to specify that using the following type of preferences. To specify a particular ranking over component occurrences, users can specify a component ranking performance type of preferences. The following is an example where compA is more preferred than compB, note that both A and B are mentioned within the body of component M.

```
/#*
@type "spl"
@tags K tag1 tag2
@tags L tag3
@prefer_order compA compB      // specification of preferences
*#/
Composite M (output K, L; input G, H){
  <component body>
}
```

The above indicates that not only both compA and compB are preferred to any other component other than compA and compB, but also indicates a preferences ordering among the two and that compA is more preferred than compB if there is a choice between the two. This can be extended to any number of components using the same syntax as follows:

@prefer_order comp1 comp2 . . . comp_n

The above indicates that comp1 . . . comp_n are preferred to any other component not mentioned, but out of those comp1 is more preferred than comp2 and comp2 is more preferred than comp3 and so on.

Just like the occurrence preferences, one can also indicate a preference for not having a component within the flow. This can be done, for example, by specifying "~" before the name of the component or the use of another indicator. So for example, one can say: @prefer_order~compA compB. This indicates that it is preferred to not have compA, but have compB, but it is more preferred to not have compA. So for example if compA, compB, and compC are mentioned in the body of component M, and if all three are possible to be in the flow then including both compB and compC satisfies the preference formula. However, if they are mutually inconsistent within each other then just including compB in the flow satisfies the preference statement.

Note that again if component M is not selected to be part of the flow, then the preference statement will be treated as satisfied.

In a further example of this preference type, one can specify that a component is equally preferred than another one within the same ordering preference. This can be done, for example, using brackets. Here is the syntax for this:

@prefer_order compA [compB compC]

The above indicates that compA, compB, and compC are preferred, but compA is more preferred than compB and compC, both of which are equally preferred.

The temporal relation preferences indicate that either a component (its negation) or a tag (or its negation) is preferred to occur or be in the flow somewhere before this component is invoked. Similar to the previous types of preferences they are specified within a body of component M, where M is a composite or abstract. Here is an example:

```
/#*
@type "spl"
@tags K tag1 tag2
@tags L tag3
@prefer_upstream compA     // specification of preferences
*#/
Composite M (output K, L; input G, H){
  <component body>
}
```

The above indicates that it is preferred for compA to occur prior to component M. Again this is conditioned upon component M's occurrence and if component M is not invoked, the preference statement will be satisfied automatically.

An example of where it is preferred for a tag in a particular input is illustrated below. The example is where tag5 is preferred to be in the flow either in input G or input H. This is the soft version of input constraint for component M. In at least one embodiment, this preference type can be extended to deal with negated tags as well. So in that case, tag 5 could be in the flow and then negated by some other components but the preference statement would be satisfied. So it would not necessary be the case that tag5 should be in input G or H, as it could have been negated by the time it reaches composite M.

```
/#*
@type "spl"
@tags K tag1 tag2
@tags L tag3
@prefer_upstream tag5     // specification of preferences
*#/
Composite M (output K, L; input G, H){
  <component body>
}
```

Additionally, similar to previous types one can have multiple different preferences of this type in the same metadata. To enable ranking over these, one needs the next type of preferences.

To indicate a ranking over components (or tags), one can specify them similar to the component ranking preferences discussed above. The syntax for this type of preferences is as follows:

@prefer_upstream order C1 C2 . . . , where C1, C2, . . . are component names

@prefer_upstream order T1 T2 . . . , where T1, T2, . . . are tag names

The set of tags belong to a tag hierarchy (also referred to as taxonomy), where a tag can "inherit from" one or more other tags. For example in the tag hierarchy illustrated in FIG. 7, IBM is a Company, Tech is an Industry and so on.

Figure 7:
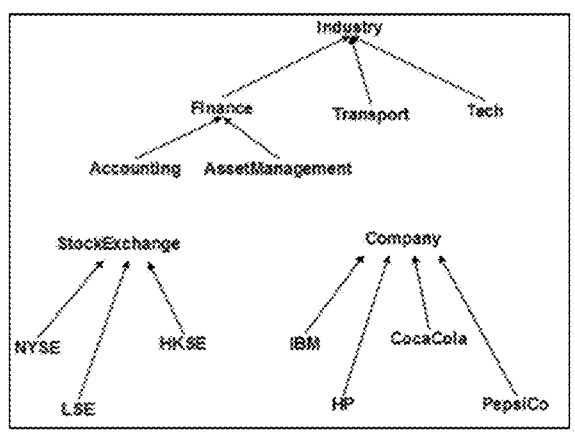
FIG. 7 illustrates an example of a tag hierarchy.

While FIG. 7 only shows single-parent inheritance, tags can have multiple parents. In at least one embodiment, the tag hierarchy is highly domain specific and they are not meant to be a standard ontology. Different application domains may have different sets of tags and different tag hierarchies. Also, the relations in FIG. 7 may correspond to different semantic relations like sub-class, instance-of, located-in, etc.

The tag preferences indicate that a particular tag is preferred to another; this can be specified within the taxonomy with an easy to specify syntax. Note that, similar to other types of preferences, we could specify a negative preference as well, indicating that a particular tag is not preferred.

As discussed previously, in at least one embodiment, preferences can be specified at different priorities. The default priority in such an embodiment for all preferences is medium. For illustration purposes one could also specify a priority of high or low for any preference formula. In an alternative embodiment, different or additional levels may be used for providing preference priority and based on this disclosure one of ordinary skill in the art should appreciate how to make the adjustment. The following syntax example specifies a high priority for occurrence of component compA.

```
/#*
@type "spl"
@tags K tag1 tag2
@tags L tag3
@prefer_priority high        // specification of preference priority
@prefer_component compA      // specification of preferences
*#/
Composite M (output K, L; input G, H){
<component body>
}
```

One can also specify a high or low priority for occurrence order preferences as follows:

```
/#*
@type "spl"
@tags K tag1 tag2
@tags L tag3
@prefer_priority low         // specification of preference priority
@prefer_order compA compB    // specification of preferences
*#/
Composite M (output K, L; input G, H){
<component body>
}
```

A reason for specifying preference priority is that, it could be preferences are specified in multiple levels of the cascade component, and depending on the user, one should overwrite the other. Using simple priorities as above would help give more weight to one preference statement as oppose to another preference statement.

In at least one embodiment, the priority level will be applied to all preferences specified within the metadata for component M not just one preference.

Finally, if it is desired to have a range of priorities rather than low/med/high, then in at least one embodiment this is accomplished within a configuration file defined for the project.

A. Examples

To provide further examples, a few common scenarios that are possible are provided.

1. Default Choice of an Abstract Component

Referring to FIG. 6, here is a way to express a default choice that is preferred for an abstract component.

```
/#*
@title "BI Computation"
@tags BargainIndex BargainIndex
@prefer_component BIComp_Simple
*#/
abstract composite BIComp  (input Vwap, QuoteFilter; output BargainIndex) {
}
/#* @type "spade"
```

-continued

```
@title "Compute Simple Bargain Index"
@tags BargainIndex   Simple LinearIndex
*#/
composite BIComp_Simple  (input Vwap, QuoteFilter; output BargainIndex) : BIComp{
//Embedding SPADE code snippet /$ stream @BargainIndex@ (bargainindex : Float)
:= Join( @Vwap@ <count(1)>;     @QuoteFilter@ <count(0)> ) [true]
    { select(cvwap > askprice*100.0,   (cvwap-askprice)/askprice, 0.0) }
$/ }
```

2. Default Choice for an Enumeration

One way to express a default choice such as FilterTradeByTickers for the StockBargainIndexComputation component is as follows:

```
/#*
@title "Stock Bargain Index Computation"
@tags final
@prefer_component FilterTradeByTickers
*#/
Composite StockBargainIndexComputation(output final){
<component body>
}
```

3. Default Choice for an Optional Component

One way to express that an optional component is more preferred is as follows:

```
/#*
@title "Stock Bargain Index Computation"
@tags final
@prefer_component ~FilterTradeByTickers
@prefer_component ~FilterTradeByIndustry
*#/
Composite StockBargainIndexComputation(output final){
<component body>
}
```

Then the optional choice is higher ranked or is more preferred.

4. Raking of Concrete Components

Referring back to FIG. 6, in this example, a ranking over the concrete components is stated.

```
/#*
@type "spl"
@title "BI Computation"
@tags BargainIndex
@prefer_order BIComp_Simple BIComp_Complex
*#/
abstract component BIComp(input Vwap, QuoteFilter; output BargainIndex) {
}
```

Here is another example:

```
/#*
@title "Stock Bargain Index Computation"
@tags final
@prefer_order TAQTCPSource TAQFileSource
*#/
Composite StockBargainIndexComputation(output final){
<component body>
}
```

B. Implementation Example

An implementation of at least one embodiment is provided to give an example of the semantics of the preferences before describing how the planning problem is updated in such a way that the satisfaction of preferences would map to finding minimum cost plans.

1. Semantics of the Preferences

Similar to preference semantics of PDDL3 (preference language for planning problems), numbers are used to determine the satisfaction of a preference statement/formula.

Satisfaction Number: Each preference statement obtains a number between 0 and 1 to indicate its satisfaction level; 0 indicates that the preference formula is fully satisfied and 1 indicates that it is not satisfied. As discussed above in alternative embodiments, the numeric range can be different than zero to one. Any number in between indicates a partial satisfaction of the preference. The partial satisfaction is calculated by normalization of the formula to the preference range.

Multiplier: The multiplier number determines the accurate weight of the preference formula. The multiplier is determined by the preference priority level and number of preferences specified within the same metadata.

Metric: The metric is the sum of all satisfaction numbers multiplied by their multipliers.

The objective in at least one embodiment is to find a flow with a minimum metric value. However, note that a flow with the metric value of zero may not exist and in that case the next best metric is the optimal metric (in other words, optimal metric may not necessary be zero).

In an alternative embodiment, the ranking preferences (component ranking preferences and temporal relation ranking preferences) allow partial satisfaction of a preference formula, while the others do not. That is the component occurrence preference is either satisfied and gets assigned a value of 0 or it is not and in that case gets a value of 1. Similarly, the temporal relation preference and tag preferences either get assigned a value of 0 or 1. However, the ranking preferences can get a value of 0 and 1 or any number in between.

Assume there is a preference ranking formula of type prefer_order (the calculation is exactly the same for temporal relation ranking formula). Here is the prefer_order formula:

@prefer_order comp1 comp2 comp3 . . . compN

This preference formula is fully satisfied if all mentioned components (comp1 . . . compN) are part of the flow. And in that case it will get assigned a value of 0. If none of the mentioned components are mentioned in the flow then it will get a value of 1 (indicating that the preference formula is fully falsified (i.e., not satisfied)). Now if there are some subset of the components mentioned then it will get a value between 0 and 1 depending on whether it has the more preferred component mentioned in the flow or not; this is the order of comp1 then comp2 then comp3 . . . and finally compN. An example of how to calculate this number is illustrated in FIG. 8 and is as follows: assume there are n components mentioned in the preference, 805; let i be the place where the component is mentioned in the preference order starting with 0 (in this example the i for comp1 is 0, and for comp2 is 1 . . . ), 810; let $m=1+2+\ldots+(n-1)+n$, 815; for each component calculate $z=(n-i)/m$, 820; and then sum up all z values of components that did not appear in the flow to obtain the satisfaction number, 825. In an alternative embodiment, m equals n, a multiple of n, or a predetermined weight times n where the predetermined weight is any positive number. In a further embodiment, the multiple or the predetermined weight is predetermined or set by at least one user.

In at least one embodiment, the satisfaction number will be automatically assigned to 0 if the preference statement was defined within a metadata of a component that did not appear in the flow. In the following examples the assumption that this component did appear in the flow (example: component M in the examples mentioned earlier did appear in the flow).

A further example is the following preference formula:

@prefer_order compA compB

This preference formula is satisfied if both components A and B are part of the flow, but if that is not possible, then compA is preferred to compB. To assign weights we normalize numbers giving more weights to compA:

n=2
m=3
z for compA is $=2/3$
z for compB is $=1/3$

Note this preference formula will never be fully satisfied if it is not possible for both compA and compB to appear in the flow. However, if only compA is in the flow then the preference satisfaction number would be $1/3$, and if only compB then the satisfaction number is $2/3$, if both compA and compB are in the flow then 0+0=0, indicating the preference formula is fully satisfied, and finally if neither are in the flow then $2/3+1/3=1$ indicates that the formula is fully falsified. Assuming that both compA and compB cannot be both in the flow and that the multiplier is 1 and this is the only preference formula that we have compA is more preferred than compB since $1/3<2/3$ and we are minimizing the metric value. This can be generalized to any n numbers and more examples will be provided later in this disclosure. In an alternative embodiment, other satisfaction numbers are assigned to the preferences by the set of users.

In at least one embodiment, the satisfaction of a negated component or tag is treated in the exact same way but consider the opposites.

In a further embodiment, if components are equally good, specified using brackets as mentioned earlier, then the normalization is done in such a way that z values are equal for the components. Here is an example:

@prefer_order compA [compB compC]
n=2 (compB and compC are considered as one entity)
m=4
i for compA=0
i for compB=i for compC=1
z for compA=$1/2$
z for compB=z for compC=$1/4$ Where m is calculated by 1+1+2, we count backward from 1, and 1 is assigned to both compB and compC.

2. Determining the Multiplier

The multiplier helps address conflicting preferences. In at least one embodiment, there are two main components that determine the multiplier: a priority and a number of preferences defined within the same metadata.

The priority multiplier is set to the following numbers in this illustrative example. These can change again depending on how many types of priority that are to be considered. High gets $5/8$, medium gets $1/4$, and low gets $1/8$. In at least one further embodiment, these are the multipliers for all preference formulas under the component that the priority level was defined for.

Now if there are n preferences defined within the same metadata, then the priority multiplier can be divided by the number of preferences to get an accurate weight of a particular formula.

This would avoid multiple small low priority preferences to add up against one high priority one (see the example below).

To provide an illustration of how this works, a few examples will be outlined that highlight how assigning numbers work in determining the semantics of the given preferences in this illustrative implementation.

In the first example, the same preference is expressed with multiple priorities. An example is as follows:

```
/#*
@prefer_priority medium
@prefer_order compB compA        // lets call this formula 1
*#/
Composite M (outputs; inputs){
<component body>
}
/#*
@prefer_priority high
@prefer_order compA compB        // lets call this formula 2
*#/
Composite N (outputs; inputs){
<component body>                 // the body mentions component M
}
```

The preference statement with high priority in at least one embodiment will have more impact in determining which component to choose in the flow, that is it would be expected that compA is selected if compA and compB are mutually inconsistent and only one can be chosen.

Here is how the system may ensure this in at least one embodiment. The multiplier for the preference with medium priority is $\frac{1}{4}$, and for the high priority preference is $\frac{5}{8}$. Note these are the only preferences mentioned in the metadata. If both compA and compB can be in the flow, then the satisfaction numbers would be 0 and both formulas are satisfied, the converse holds if none of them can be in the flow. If compA can be in the flow and not B, then:

Metric=satisfaction number for formula $1 * \frac{1}{4}$+satisfaction number for formula $2 * \frac{5}{8} = \frac{2}{3} * \frac{1}{4} + \frac{1}{3} * \frac{5}{8} = 0.37$ If compB can be in the flow and not compA, then:

Metric=satisfaction number for formula $1 * \frac{1}{4}$+satisfaction number for formula $2 * \frac{5}{8} = \frac{1}{3} * \frac{1}{4} + \frac{2}{3} * \frac{5}{8} = 0.50$ Since 0.37<0.5, having compA in the flow would be more preferred than having compB, which is what is expected based on the respective priority levels.

In the second example, there is a summation of multiple lower priority preferences. This example demonstrates how the multiplier would ensure that having multiple lower priority preferences does not override the one high priority preferences that might be present in the preferences.

```
/#*
@prefer_priority medium
@prefer_component medium compB1           // lets call this
                                          formula 1
@prefer_component medium compB1.. compB5  // lets call this
                                          formula 2
@prefer_component medium compB2           // lets call this
                                          formula 3
*#/
```

```
Composite compB (outputs; inputs){
<component body>         // the body mentions compB1 ... compB5
}
/#*
@prefer_priority medium
@prefer_order compA1 compA2              // lets call this
                                         formula 4
*#/
Composite compA (outputs; inputs){
<component body>         // the body mentions a choice between
                           compA1, compA2
}
/#*
@prefer_priority high
@prefer_order compA compB                // lets call this
                                         formula 5
*#/
Composite N (outputs; inputs){
<component body>         // the body mentions a choice between
                           compA and compB
}
```

Next, the metric value is calculated for the interesting cases to determine how the system would decide which component is more preferred.

If compA1 is selected in the flow (no other component can be selected) then:

Metric=$\Sigma$ satisfaction of formula $i$*multiplier of formula $i$

Metric=$1 * \frac{1}{4} * \frac{1}{3} + 1 * \frac{1}{4} * \frac{1}{3} + 1 * \frac{1}{4} * \frac{1}{3} + \frac{1}{3} * \frac{1}{4} + \frac{1}{3} * \frac{5}{8} = 0.54$ If compA2 is selected in the flow:

Metric=$1 * \frac{1}{4} * \frac{1}{3} + 1 * \frac{1}{4} * \frac{1}{3} + 1 * \frac{1}{4} * \frac{1}{3} + \frac{2}{3} * \frac{1}{4} + \frac{1}{3} * \frac{5}{8} = 0.62$ If compB1 is selected in the flow:

Metric=$0 * \frac{1}{4} * \frac{1}{3} + (1-0.33) * \frac{1}{4} * \frac{1}{3} + 1 * \frac{1}{4} * \frac{1}{3} + 1 * \frac{1}{4} + \frac{2}{3} * \frac{5}{8} = 0.806$ If compB2 is selected in the flow:

Metric=$1 * \frac{1}{4} * \frac{1}{3} + (1-0.27) * \frac{1}{4} * \frac{1}{3} + 0 * \frac{1}{4} * \frac{1}{3} + 1 * \frac{1}{4} + \frac{2}{3} * \frac{5}{8} = 0.811$ If all compB1 through compB5 are selected in the flow:

Metric=$0 * \frac{1}{4} * \frac{1}{3} + 0 * \frac{1}{4} * \frac{1}{3} + 0 * \frac{1}{4} * \frac{1}{3} + 1 * \frac{1}{4} + \frac{2}{3} * \frac{5}{8} = 0.67$ Hence, as illustrated, compA1 is more preferred to compA2, compA2 is more preferred to compB1 and compB1 is more preferred to compB2, etc. Also selecting compA1 or compA2 is preferred than the case where all compB's are selected.

In the third example, an example of how to deal with symmetry is provided. If one likes to have symmetric preferences for example, compA is preferred to compB and then at a separate place state that compB is preferred to compA, then to avoid getting unanticipated results, the two statements should be stated with different priorities. For this example, preferring compA to compB has a high priority, and then if compA is selected the metric would be 0.456 and if compB is selected it would be 0.50, and if compC is selected then it would be 0.96. Hence, compA is preferred to compB and compB is preferred to compC as expected.

C. Updating the Planning Problem

The Cascade language is compiled to a planning problem and the planner computes a solution to the compiled planning problem. In the implementation of preferences, this planning problem is updated by compiling away the preferences to planning action costs. Then the planner is used to find the minimum cost plan. This maps to finding a flow with a minimum metric and also maps to finding the preferred flow with respect to the preferences.

Next is a discussion of a method embodiment illustrated in FIG. 9 to handle component occurrence preferences. This approach can be generalized to deal with other types of preferences. Note the planning language described in the examples is the SPPL planning language, although other planning languages could be used depending on the planner used.

A unique "sticky" tag is assigned to each component, 905. As discussed previously, a "sticky" tag is when any port is annotated by a tag, then all downstream data links in a flow are also annotated by this tag, unless another component explicitly removes this tag. In order to track whether a component has occurred in the flow or not, a unique tag for each component is useful. In case a component is shared or appears in more than one place, the unique tag should be assigned to each occurrence of the component so that it can easily disambiguate the different occurrences from each other. This unique tag should be added to the output port of each component.

Here is an example of unique tag for our financial domain example, shown in FIG. 6:
_Effect_TAQ_FileSource—StockBargainIndexComputation-VWAP-TradeQuote-1836_t A dimension is added to the cost/quality vector, 910. The new dimension will be used for preference satisfaction times the multiplication number. It will be set to 0 for all other planning actions, except the ones that are added for preference satisfaction (the collect/forgo actions or the preference actions). The bound and objective function will be changed.

An example is as follows:
(:objective −1 0 100)
(:bound 1000000 200 400)

A sticky tag is added for each preference that also updates constants, 915. For each preference, a sticky tag is added. This tag is used to determine whether this preference has been looked at or not. In at least one embodiment this leads to updating the goal to mention that these are the preferences that need to be looked at. An examples is as follows:
_Effect_TAQ_TcpSource—StockBargainIndexComputation-VWAP-TradeQuote-1836_softgoal_t A tag is added for each preference order that also updates constants that are non-sticky, 920. Non-sticky tags in at least one embodiment are used to enforce a total order of preferences. This order can be automatically generated by the system. An example is as follows:
_p0_t A collect/forgo action is added for each preference, 925. In at least one embodiment, this notes the order of the preferences. In at least one embodiment, the system needs to have three actions, two collect actions and one forgo action. The reason for having two collect actions is that each preference is conditioned upon whether the component whose metadata is used to specify the preference is in the flow or not. If it is not in the flow the preference will be automatically satisfied. The other collect action indicates that the preference is satisfied because the component tag does appear in the flow. The forgo action is taken if the component tag does not appear in the flow. Here is an example of how to write the three actions for preference "prefer_component FilterTradeQuoteByTickers" with priority high:

```
// First collect action, the condition does not hold
(:action FilterTradeQuoteByTickers--StockBargainIndexComputation-VWAP-
    FilteredTradeQuote-1840_softgoal_condition_collect
        :singleton
        :parameters (?id1_p - _FilterTrade ?id2_p - _p3_t )
        :cost ( −1 1 0)
        :precondition [collect_p1_in] (and
        (T ?id2_p)
            (not (S ?id1_p)) ;; the condition does not hold
        )
        :effect [collect_p1_out](and
            (S _Effect_FilterTradeQuoteByTickers--StockBargainIndexComputation-
            WAP-FilteredTradeQuote-1840_softgoal_t)
            )
        )
// Second collect action
(:action FilterTradeQuoteByTickers--StockBargainIndexComputation-VWAP-
    FilteredTradeQuote-1840_softgoal_imply_collect
        :singleton
        :parameters ( ?id1_p - _Effect_FilterTradeQuoteByTickers--
        StockBargainIndexComputation-VWAP-FilteredTradeQuote-1840_t ?id2_p - _p3_t)
        :cost ( −1 1 0)
        :precondition [collect_p1_in] (and
        (T ?id2_p)
            (S ?id1_p)      ;; the condition holds
        )
        :effect [collect_p1_out](and
            (S _Effect_FilterTradeQuoteByTickers--StockBargainIndexComputation-
        VWAP-FilteredTradeQuote-1840_softgoal_t)
            )
        )
//Forgo action
(:action FilterTradeQuoteByTickers--StockBargainIndexComputation-VWAP-
        FilteredTradeQuote-1840_softgoal_forgo
        :singleton
        :parameters ( ?id1_p - _Effect_FilterTradeQuoteByTickers--
        StockBargainIndexComputation-VWAP-FilteredTradeQuote-1840_t ?id2_p - _p3_t
```

```
    ?id3_p - _FilterTrade)
    :cost ( -1 1 1)
    :precondition [forgo_p1_in] (and
    (T ?id2_p)
      (S ?id3_p)      ;; the condition holds
      (not (S ?id1_p)) ;; the imply does not hold
    )
    :effect [forgo_p1_out](and
      (S _Effect_FilterTradeQuoteByTicker--
      StockBargainIndexComputation-VWAP-FilteredTradeQuote-1840_softgoal_t)
      )
)
```

This concludes this illustrative method to transform the planning problem to deal with component occurrence preferences.

To deal with component ranking preferences, one needs to have a preference for each component mentioned in the formula and update the costs of the preference actions to the appropriate multipliers times satisfaction numbers. For example, if the following preference formula is used:

@prefer_order compA compB

Then there will be two preference tags, one for compA and one for compB, and six preference actions, three for compA and three for compB. The preference dimension should also instead of 1 for the forgo action be either ⅔*multiplier or ⅓*multiplier. So the following would be true if multipliers were assumed to be 1:

:cost (−1 1 0.33) for compB, and :cost (−1 1 0.67) for compA.

Finally, to deal with tag preferences, step 905 can be skipped from the method illustrated in FIG. 9 while the rest of the steps remain the same.

Figure 10:
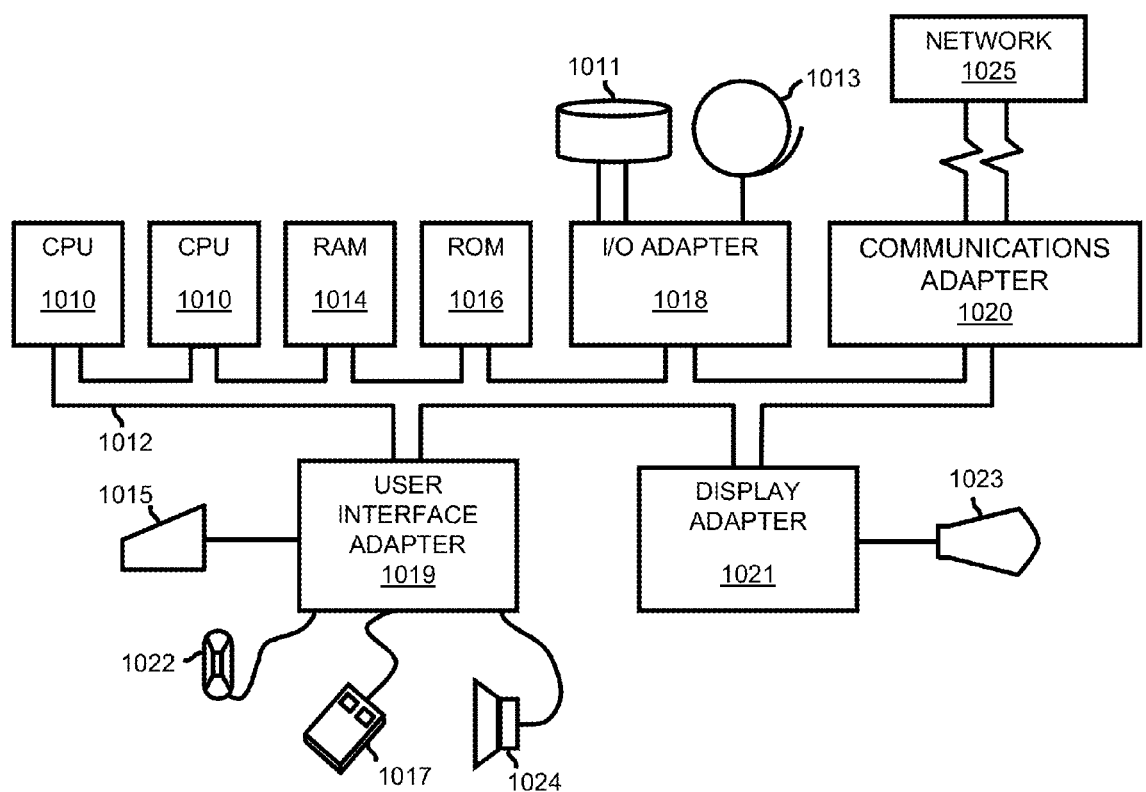
FIG. 10 illustrates a computer program product according to an embodiment of the invention.

Referring now to FIG. 10, a representative hardware environment for practicing at least one embodiment of the invention is illustrated. This schematic drawing illustrates a hardware configuration of an information handling/computer system in accordance with at least one embodiment of the invention. The system comprises at least one processor or central processing unit (CPU) 1010. The CPUs 1010 are interconnected with system bus 1012 to various devices such as a random access memory (RAM) 1014, read-only memory (ROM) 1016, and an input/output (I/O) adapter 1018. The I/O adapter 1018 can connect to peripheral devices, such as disk units 1011 and tape drives 1013, or other program storage devices that are readable by the system. The system can read the inventive instructions on the program storage devices and follow these instructions to execute the methodology of at least one embodiment of the invention. The system further includes a user interface adapter 1019 that connects a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023 which may be embodied as an output device such as a monitor, printer, or transmitter, for example.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for operation of a system for determining a set of plans that best match a set of preferences, said method comprising:
receiving at least one goal to be accomplished by the set of plans, where the at least one goal is received by a goal specification interface;
receiving a pattern that includes preferences from at least one user, where a preference engine receives the pattern, wherein preferences include at least one of the following: an occurrence of at least one component, a non-occurrence of at least one component, an occurrence of at least one component over at least one other component, an ordering between at least two components, an existence of at least one tag in a final stream, an existence of at least one tag over at least one other tag in the final stream, and a non-existence of at least one tag in the final stream;
generating a planning problem based on the received at least one goal and the received pattern, where the preference engine generates the planning problem;
generating a set of plans, where at least one planner generates the set of plans, wherein the set of plans includes the top-k plans, wherein generating the set of plans includes using the preferences to determine which plans best match the preferences using for each plan found by the planner a sum of a satisfaction number for each preference with the top-k plans being the k plans with the lowest sums of satisfaction numbers, wherein the satisfaction number for each preference is modified by a multiplier representing a priority level of the preference; and
providing the set of plans for selection of one plan to deploy.

2. The method according to claim 1, wherein generating the planning problem includes providing the planning problem to at least one planner.

3. The method according to claim 1, wherein k is a predetermined constant.

4. The method according to claim 1, wherein each preference has the same range of preference values that provide the satisfaction number.

5. The method according to claim 4, wherein the preference value range is zero to one.

6. The method according to claim 5, further comprising determining the satisfaction number for a multiple component preference order by setting i equal to n−1 where n is a number of components in the preference order, wherein i is the nth component and 0 is the first component, setting m equal to a summation of 1 to n, for each component, calculate z equal to (n−i)/m, and sum up all z values of components that did not appear in the plan to obtain the satisfaction number.

7. The method according to claim 1, further comprising updating the planning problem with the preference engine by adding a dimension to a cost/quality vector where the dimension will be used for preference satisfaction modified by a multiplier, adding a sticky tag for each preference being added to the planning problem, adding a tag for each preference being added to the planning problem, and adding a collect/forgo action for each preference being added to the planning problem.

8. The method according to claim 7, wherein updating further includes assigning a unique sticky tag to each component.

9. The method according to claim 1, wherein each preference is at least one of: an occurrence of at least one component within a flow, a non-occurrence of at least one component, an occurrence of one component over at least one other component, a temporal relation between at least two components, a temporal relation over tags, a temporal relation ranking of components, a temporal relation ranking of tags, and an existence of a tag or a preference over tags.

10. A computer program product for finding a set of plans that reach a goal based on a set of preferences, said computer program product comprising:
a computer readable storage medium having encoded thereon:
first program instructions executable by a processor to cause the processor to receive at least one goal to be accomplished by the set of plans;
second program instructions executable by a processor to cause the processor to receive a pattern that includes preferences from at least one user, where the preferences include at least one of the following: an occurrence of at least one component, a non-occurrence of at least one component, an occurrence of at least one component over at least one other component, an ordering between at least two components, an existence of at least one tag in a final stream, an existence of at least one tag over at least one other tag in the final stream, and a non-existence of at least one tag in the final stream;
third program instructions executable by a processor to cause the processor to generate a planning problem based on the received at least one goal and the received pattern;
fourth program instructions executable by a processor to cause the processor to generate a set of plans for the generated planning problem, wherein the set of plans includes the top-k plans where k is a predetermined constant, wherein the fourth program instructions uses the preferences to determine which plans best match the preferences using for each plan found by the planner a sum of a satisfaction number for each preference with the top-k plans being the k plans with the lowest sums, wherein the satisfaction number for each preference is modified by a multiplier representing a priority level of the preference; and
fifth program instructions executable by a processor to cause the processor to provide the set of plans for selection of one plan to deploy.

11. The program product according to claim 10, wherein the preference value range is zero to one.

12. The program product according to claim 10, wherein the computer readable storage medium further having encoded thereon: sixth program instruction executable by a processor to cause the processor to update the planning problem by adding a dimension to a cost/quality vector where the dimension will be used for preference satisfaction times a multiplier, adding a sticky tag for each preference being added to the planning problem, adding a tag for each preference being added to the planning problem, and adding a collect/forgo action for each preference being added to the planning problem.

* * * * *